Dec. 13, 1927.  J. P. NEFF  1,652,993
MERRY-GO-ROUND
Filed Feb. 24, 1927
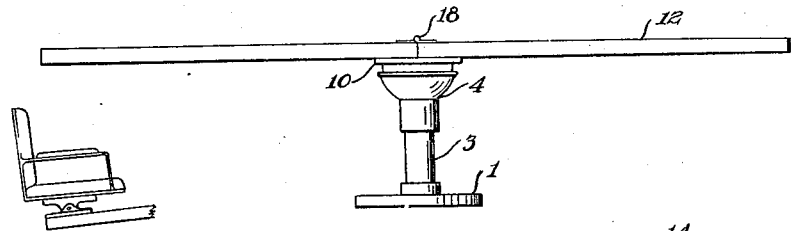
Fig.8.  Fig.1.
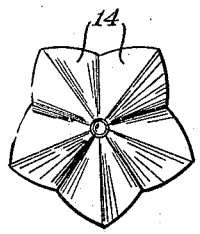
Fig.3.
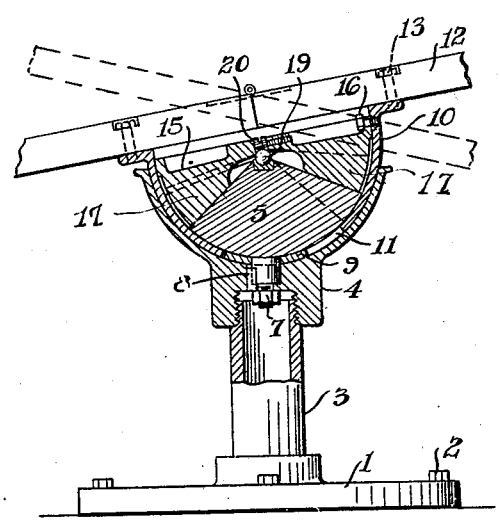
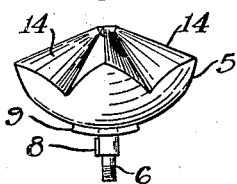
Fig.4.
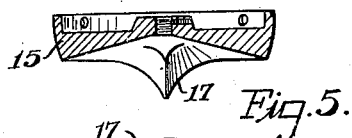
Fig.5.
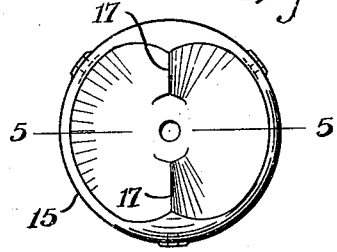
Fig.6.
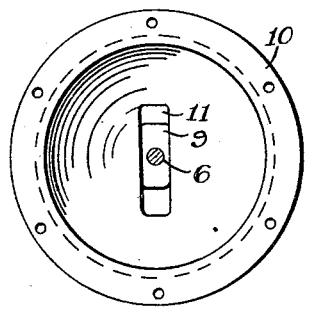
Fig.7.
INVENTOR.
Joseph P. Neff
BY
ATTORNEY.

Patented Dec. 13, 1927.

1,652,993

UNITED STATES PATENT OFFICE.

JOSEPH P. NEFF, OF BRADFORD, OHIO, ASSIGNOR OF ONE-HALF TO WILLIAM W. NEFF, OF DAYTON, OHIO.

MERRY-GO-ROUND.

Application filed February 24, 1927. Serial No. 170,636.

This invention relates to improvements in merry-go-rounds.

In the accompanying drawings which serve for illustrating the invention in one form:

Fig. 1 is a view in side elevation of the merry-go-round;

Fig. 2 is a sectional view in elevation;

Figs. 3-4 are sectional and plan views respectively of one of the bearing members;

Figs. 5-6 are sectional and plan views respectively of another bearing member;

Fig. 7 is a plan view of a third bearing member;

Fig. 8 is a detail view of a seat for the device.

The device, as here shown, is of the combination merry-go-round and teeter board type.

The objects attained in the invention consist in a device of the character described in which the leverage of the teeter board in operation is utilized for effecting the rotatable movement of the device; simplicity and durability of construction, and ease and smoothness of operation.

The construction consists of a base 1 adapted to be secured to a floor or any suitable sub-base by bolts 2; a column 3, here shown as a section of pipe threaded into base 1, and threaded at its upper end for receiving the internally threaded end of a concave bearing member 4.

Supported in member 4 is an inverted convex bearing member 5, best shown in detail Figs. 3-4. The parts 4-5 are assembled one with the other by means of a stem 6 secured at its upper end in part 5 and extended through an aperture in the bottom of part 4, the lower end of the stem being threaded for a nut 7 which together with a key 8 on stem 6 coacting with a corresponding slot in the aperture of part 4, act to hold parts 4-5 in fixed relation one with the other.

Parts 4-5 are spaced one from the other as illustrated in Fig. 2, by a metal pad 9 which is centered and rotatable on stem 6, the spacing between the parts being the required extent for providing suitable bearing surfaces between the parts for a convexo-concave bearing member 10, best shown in detail Fig. 7, which is provided with a slot 11 for receiving the pad 9, the slot being longer than the pad to provide clearance for the teetering movement of the board 12 which is secured to part 10 by bolts 13.

A series of conical shaped radially extended cams are formed in the upper face of part 5, there being five double faced cams 14 in the series. A member 15, secured in the upper portion of part 10 by bolts 16, is provided with two diametrically opposite, radially extended, inverted cams 17 which coact with cams 14 for imparting a step-by-step rotatable movement, alternated with a teetering movement, to the board 12 when the device is in operation. The arrangement of cams 14—17 relative to each other is such that one of the cams 17 will pass over a cam 14 as the other cam 17 moves downwardly between adjacent cams 14. The coacting cam surfaces on the downward teetering movement act under the leverage of the teeter board to impart the rotatable movement to the device in either direction as may be determined by the operators.

As here shown, the teeter board is in two sections, being hinged one piece to the other as indicated at 18 to reduce the length of the board for convenience in handling.

A single ball bearing 19 is supported in the apex of part 5, part 15 being provided with an adjustable threaded bearing stud 20 which serves as the opposite bearing member for the ball 19. Friction between the parts is thus minimized and an easy step-by-step movement is effected.

The merry-go-round may readily be adapted for more than two persons by providing suitable seats on the teeter board as illustrated in Fig. 8 in which a rocking seat for two or more persons is shown.

Having described my invention, I claim:

1. A merry-go-round comprising a base, a concave bearing member supported on the base, a convex bearing member supported in the concave member, a part interposed between said members for spacing one from the other, a convexo-concave bearing member operable between the first named bearing members, and a seat board supported on the last named member.

2. A merry-go-round comprising a base, a concave bearing member supported on the base, a convex bearing member supported in the concave member, a part interposed between said members for spacing one from the other, a convexo-concave bearing member operable rotatably between the first named bearing members, and a seat board supported on said last named member.

3. A merry-go-round comprising a base, a concave bearing member supported on said base, a convex bearing member supported in the concavity of the first named member, a part interposed between said members for spacing one from the other, a convexo-concave bearing member having rotatable and rocking movement between the first named bearing members, and a seat board supported on said last named member.

4. A merry-go-round comprising a base, a concave bearing member supported on the base, a convex bearing member supported in the concave member, a part interposed between said members for spacing one from the other, a convexo-concave bearing member having coincident rotatable and rocking movement supported between the bearing surfaces of the first named members, and a seat board supported on said last named member.

5. A merry-go-round comprising a base, a concave bearing member supported on said base, a convex bearing member supported in the concave member, a part operable rotatably between and acting to space the bearing surfaces of said members one from the other, a convexo-concave bearing member having a rotatable rocking movement between said first named bearing members and having a slot coacting with said part for limiting said rocking movement, and a seat board supported on said last named bearing member.

6. A merry-go-round comprising a base, a concave bearing member supported on said base, a convex bearing member supported in the concave member, a part interposed between said members for spacing one from the other, a convexo-concave bearing member operable between the first named bearing members, a seat board supported on the last named bearing member, a series of cam surfaces arranged in the upper face of the convex bearing member, and a member supported in the convexo-concave member having cam surfaces adapted to coact with said series of cam surfaces for effecting step-by-step teetering movement coincident with rotatable movement of said board.

7. A merry-go-round comprising a base, a concave bearing member supported on said base, a convex bearing member supported in the concave member, a part interposed between said members for spacing one from the other, a convexo-concave bearing member operable between the first named bearing members, a seat supported on the last named member, a series of cam surfaces arranged in the upper face of the convex bearing member, and a member supported in the convexo-concave bearing member having cam surfaces adapted to coact singly progressively with said series of cam surfaces for effecting step-by-step teetering movement coincident with rotatable movement of said seat.

8. A merry-go-round comprising a base, a concave bearing member supported on said base, a convex bearing member supported in the concave member, a part interposed between said members for spacing one from the other, a convexo-concave bearing member operable between the first named bearing members, a seat board supported on the last named member, a series of cam surfaces arranged in the upper face of said convex member, and a member supported on the convexo-concave member having diametrically opposite cam surfaces arranged to coact alternately with said series of cam surfaces for effecting step-by-step teetering movement coincident with rotatable movement of the seat board.

9. A merry-go-round comprising a base, a concave bearing member supported on the base, a convex bearing member supported in the concave member, a part interposed between said members for spacing one from the other, a convexo-concave bearing member operable between the first named bearing members, a seat board supported on the last named bearing member, a series of oppositely disposed cam surfaces arranged on the upper face of said convex member, and a part supported on the convexo-concave member having a plurality of cam surfaces arranged to coact with one or the other of said oppositely disposed cam surfaces for effecting step-by-step teetering movement coincident with rotatable movement in either direction of said board.

10. A merry-go-round comprising a base, a concave bearing member supported on said base, a convex bearing member supported in the concave member, a part interposed between said members for spacing one from the other, a convexo-concave bearing member operable between the first named members and a seat board supported on the last named member, a series of radially extended cam surfaces arranged on the upper face of the convex member, a member supported on the convexo-concave member having a plurality of radially extended cam surfaces adapted to coact alternately with the cam surfaces of said series for effecting step-by-step teetering movement coincident with rotary movement of said board.

11. A merry-go-round comprising a base, a concave bearing member supported on said base, a convex bearing member supported in the concave member, a part interposed between said members for spacing one from the other, a convexo-concave bearing member operable between the first named bearing members and a seat board supported on the last named member, a series of cam surfaces arranged on the upper face of said convex member, a part supported on the convexo-concave member having a plurality of cam surfaces adapted to coact with the cam surfaces of said series for effecting rotatable and teetering movement of said board, and a ball bearing between said cam supporting members.

In testimony whereof, I affix my signature.

JOSEPH P. NEFF.